Patented Aug. 6, 1929.

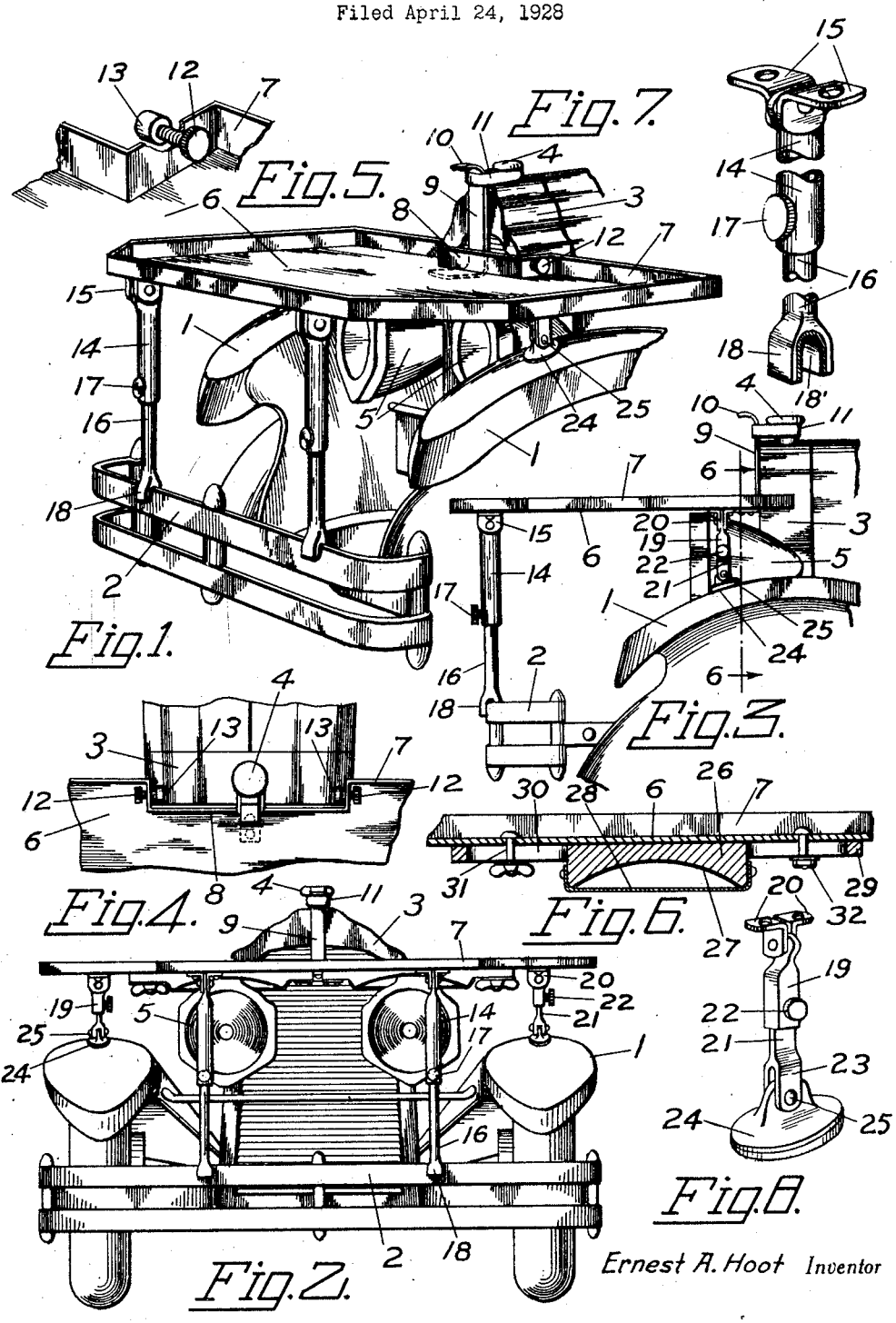

1,723,238

UNITED STATES PATENT OFFICE.

ERNEST A. HOOT, OF SPOKANE, WASHINGTON.

AUTOMOBILE REPAIR TRAY.

Application filed April 24, 1928. Serial No. 272,531.

My present invention relates to an improved automobile repair tray which is readily adapted for attachment at the front portion of an automobile and is designed to receive and support parts of the automobile, tools, etc., while repairs are being made to the automobile. As is well known, when repairs are being made in the repair shop or garage the removed parts and tools are frequently mislaid or lost, which requires loss of time in finding or replacing the parts. By the use of the device of my invention the automobile which is being repaired may with facility be equipped with means whereby the parts and tools may be deposited in positions where they are readily accessible for use, thus saving time and labor on the repair job.

In carrying out my invention I provide a tray which has means that are readily adjustable for supporting the tray in stable position at the front of the automobile as will hereinafter be more fully set forth and claimed.

In the accompanying drawings I have illustrated one complete example of the physical embodiment of my invention wherein the parts are combined and arranged according to the best mode I have so far devised for the practical application of the principles of my invention.

Figure 1 is a perspective view at the front of an automobile showing so much thereof as is necessary to illustrate the application thereto of the tray of my invention. Fig. 2 is a front view showing an automobile equipped with the detachable tray. Fig. 3 is a side view of the device as arranged in Fig. 2. Fig. 4 is a detail top plan view showing the relation of the tray to the radiator and its cap. Fig. 5 is a detail perspective view showing one of the clamps for securing the tray to the radiator. Fig. 6 is an enlarged transverse vertical sectional view of one of the lamp rests as at line 6—6 in Fig. 3. Fig. 7 is a perspective view broken away of one of the front legs for supporting the tray. Fig. 8 is a perspective view of one of the said legs for the tray.

In order that the general arrangement and relation of parts may readily be understood I have shown the front portion of an automobile including the wheel guards or fenders 1, the front bumper 2, the radiator 3 and its cap 4, together with the two lamps 5, 5.

The tray which is supported at the front of the automobile is indicated as a whole by the numeral 6 and is fashioned with a flange 7 to prevent tools or parts from rolling off of the tray when it is attached to the automobile. At the rear of the tray a recess 8 is fashioned which is of the required size and shape to fit around the front portion of an ordinary radiator, and the tray is provided with a post 9 located in the recess and the post is fashioned with an upper flange 10. When the tray is positioned with the recess 8 about the radiator as indicated in Figs. 1 and 2 a strap 11 is passed around the radiator cap 4 and the flanged post 9 to anchor the tray to the radiator and its cap.

The tray is also provided with a plurality of clamp bolts 12 threaded through the flange 7 at opposite sides of the recess 8 and these bolts have pads 13 at their ends for frictional engagement with the opposite sides of the radiator. Thus the bolts may be screwed into clamped position with the pads 13 in frictional engagement with the sides of the radiator and the pads prevent scratching or marring of the polished surface of the radiator.

At the front of the tray are provided a pair of extensible telescopic supporting legs adapted to rest upon the bumper 2.

Each of these extensible, adjustable legs includes a tubular section 14 which is hinged at 15 at the underside of the tray and a slide rod 16 telescopes within the tubular section 14. Each tubular section has a set bolt 17 by means of which the tubular section and the slide rod are rigidly clamped in adjusted position so that the tray may be rigidly held in approximately horizontal position. At the lower ends of the slide rods 16 are provided forked feet 18 which are provided with cushions 18' and it will be apparent from an inspection of the drawings that these cushioned forked feet are designed to slip over the upper edge of the upper bar of the bumper 2 for supporting the front end of the tray.

At the opposite sides of the tray two adjustable and extensible supporting legs are provided, each of which comprises a tubular section 19 that is pivoted by means of a bracket 20 at the underside of the tray and each leg has a slide bar 21 in its tubular section which is clamped in rigid relation with said section by means of the set bolt 22. The lower end of each slide bar 21 is forked or bifurcated as at 23 and a pad 24 is pivoted at 25 in this forked end. The pad 24 as best seen in Figs. 1 and 2 is designed to rest upon the upper surface of the wheel fender 1. Thus at both sides of the tray these adjustable supporting legs may readily be adjusted to various sizes or types of wheel fenders for supporting the sides of the tray.

The tray is also designed to rest upon and be supported by the spaced lamps 5 of the automobile, and for this purpose a pair of spaced blocks 26 are carried at the underside of the tray. These blocks are adjustable so that they may be used with a pair of lamps spaced at varied distances. Each block at its underside is fashioned with a concave face 27 and this face is covered by a flexible pad 28 which may be of rubber or other suitable material and is designed to frictionally engage the top of the lamp without danger of scratching or marring it. The adjustable or slide blocks 27 are each carried in a holder 29 which is adjustably secured at the underside of the tray. For this purpose each holder has a plurality of slots 30 through which the bolts 31 pass and these bolts have clamp nuts 32 on their threaded ends. The bolts are arranged in such manner that the slotted holder may be slid or adjusted with relation to the under face of the tray in order that the blocks 27 will register with the supporting lamps, and then by means of the nuts 32 the blocks may be clamped in adjusted position.

From the above description taken in connection with my drawings it will be apparent that the device of my invention may with facility be positioned and rigidly attached to the automobile for use, and after the repairs have been made the tray may with equal facility be detached from the automobile and thus be ready for further use.

Having thus fully described my invention what I claim as new and desire to secure by Letters Patent is:

1. The combination, with a tray having a recess at its rear edge to accommodate an automobile radiator, of a post on the tray having a flanged top, a strap on the post adapted to encircle a radiator cap, and set bolts in the recessed part of the tray for clamping the latter to the radiator.

2. The combination, with a flanged tray having a recessed rear side adapted to fit about an automobile, of an upright post secured to the recessed side of the tray and a strap on the post to encircle a radiator cap, a pair of oppositely arranged set bolts in the recessed side of the tray, and pads on the ends of said bolts.

3. The combination, with a tray as described having supporting legs for engagement with a bumper and spaced fenders, of adjustable cushioned blocks on the underside of the tray adapted to rest upon spaced lamps, a cushion for each block, a holder for each block, and means for securing said holders in adjusted position with relation to the tray.

In testimony whereof I affix my signature.

ERNEST A. HOOT.